(12) United States Patent  
Sliger

(10) Patent No.: US 7,841,575 B1
(45) Date of Patent: Nov. 30, 2010

(54) UNIFIED STAND AND HANGING SUPPORT FOR FLAT PANEL DISPLAYS

(75) Inventor: Bradley J. Sliger, Seattle, WA (US)

(73) Assignee: SonoSite, Inc., Bothell, WA (US)

( * ) Notice: Subject to any disclaimer, the term of this patent is extended or adjusted under 35 U.S.C. 154(b) by 0 days.

(21) Appl. No.: 12/420,354

(22) Filed: Apr. 8, 2009

(51) Int. Cl.
*A47G 1/24* (2006.01)

(52) U.S. Cl. ...................................... 248/454; 248/688

(58) Field of Classification Search ................. 248/688, 248/691, 692, 454, 455, 457, 917, 921, 922, 248/923; 348/794, E5.128
See application file for complete search history.

(56) References Cited

U.S. PATENT DOCUMENTS

| | | | |
|---|---|---|---|
| 7,301,759 B2* | 11/2007 | Hsiung | 361/679.27 |
| 7,681,859 B2* | 3/2010 | Kim | 248/688 |
| 2005/0253040 A1* | 11/2005 | Yang | 248/688 |
| 2006/0221263 A1* | 10/2006 | Ogawa et al. | 348/794 |
| 2006/0237623 A1* | 10/2006 | Sung | 248/688 |
| 2007/0075208 A1* | 4/2007 | Chen | 248/455 |
| 2007/0164191 A1* | 7/2007 | Kim | 248/686 |

* cited by examiner

*Primary Examiner*—Ramon O Ramirez
(74) *Attorney, Agent, or Firm*—Fulbright & Jaworski L.L.P.

(57) ABSTRACT

The present invention is aimed at systems and methods by which a flat panel display may be supported by a stand, which can also be used as a hook, or other connecting mechanism, to hang the monitor from. In one embodiment, the "kickstand" can be rotated upward without disconnecting it from the body of the flat panel display. In another embodiment, the "kickstand" is attached to a VESA mounting bracket.

17 Claims, 3 Drawing Sheets

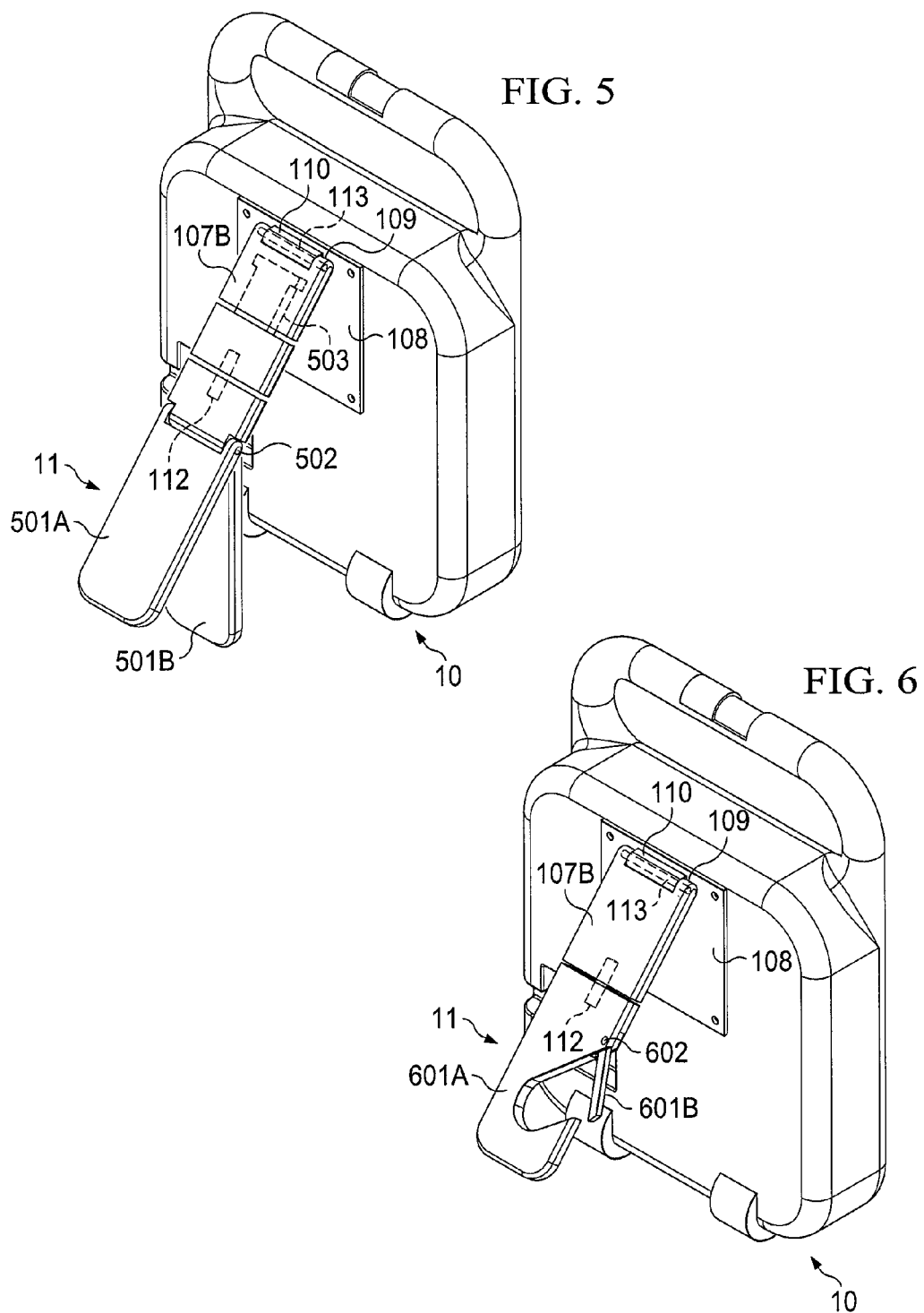

UNIFIED STAND AND HANGING SUPPORT FOR FLAT PANEL DISPLAYS

TECHNICAL FIELD

This disclosure relates to support and mounting solutions for audio and video devices, and more specifically for a unified mounting support for medical equipment.

BACKGROUND OF THE INVENTION

Flat panel displays have grown tremendously in popularity over the past decade. The price of such units have reached a point where they are used in a variety of applications in several industries. Flat panel displays use technologies such as Liquid Crystal Display (LCD) or ionized gas (plasma) to generate a picture on a screen. Because these technologies require very little space to generate a picture, the resultant sets are considered flat panels, at least in comparison to Cathode Ray Tube (CRT) monitors, which were the dominant visual display technology until earlier this decade. As the price of flat panel displays continue to decrease, they will be used in even more industries and applications.

Flat panel displays have significant advantages over CRT monitors. The most important of these are size and weight. CRT monitors are bulky, cumbersome and heavy. This makes using CRTs difficult in various situations. An example of such a situation would be a sonographic or other medical monitor for a patient brought into an emergency room on a gurney. Since the patient is being moved, a monitor (or other medical condition display) would have to move with the patient. To use a CRT monitor as a medical monitor, a specialized mount would be required to hold the heavy monitor in place. Such a mount would have to be sturdy and well built to hold the weight of the monitor. This in turn means that the doctors or nurses pushing the gurney would have to transport the weight of the monitor as well as the weight of the support. Additionally, when the patient needs to be switched to another bed, the CRT monitor would have to be relocated and/or repositioned. The use of flat panel displays greatly reduces the difficulties described in the above situation. Since the flat panel display is smaller, lighter and less cumbersome, it is easier to move than a CRT monitor. Also, the relatively small size of a flat panel monitor is less likely to get in the way of a doctor or nurse trying to administer aid to the patient.

Mounting solutions are critical to maximizing the benefit of flat panel medical displays. While a flat panel display is lighter and smaller than a comparable CRT of similar screen size, the benefits of a flat panel display are enhanced by an appropriate mounting system. Flat panel displays may simply use a stand on top of a table or similar support, however, often times it is more desirable to have the display mounted on a wall, ceiling, or hanging from another piece of furniture. By doing so, a greater amount of area is conserved. Additionally, the walls or ceiling may provide a better viewing angle or sight line than a tabletop, depending on the location and use of the display. Recognizing the importance of mounting solutions, several companies engineered different mounting solutions for various types of flat panel displays. These solutions allow flat panels to be mounted in various positions and at various angles. Some mounting solutions allow a viewer to change the angle of the display or to rotate the display to suit their viewing desires. The most common solutions allow a user to fit a mounting bracket of some kind onto the wall or ceiling. The flat panel display is then attached to the mounting bracket using screws, bolts or similar hardware.

Current mounting solutions utilize the Video Electronics Standards Association (VESA) Mounting Interface Standard (MIS) otherwise known as a VESA mount. The original VESA mount consisted of four screws arranged in a square, with the horizontal and vertical distance between the screw centers being 100 millimeter (mm). This configuration is still used for a variety of flat panel monitors. Additionally, a smaller VESA configuration, measuring 75 mm between each screw hole in a square pattern, is used for smaller displays.

Present mounting solutions, however, are inadequate in situations which require versatility in the face of constant change. Stands used to support flat panel displays only support the display in an upright position and do not allow the display to be angled for enhanced viewing by a doctor or a nurse.

Situations such as the one described above, require a mounting solution which can be easily and quickly changed to fit the needs of the moment. For example, if the nurse or doctor needs to be viewing a display constantly, it should be in a location easily viewable. However, if the doctor or nurse is working actively on the patient, and thus requires the monitor to be out of the way, but still connected to the patient, the device must be easily moved out of the way. Current mounting solutions require removing or changing the type of mounting hardware attached to the monitor to meet these needs.

Mounting solutions which require hardware changes are undesirable in situations requiring quick changes. For example, in the medical instance described above, one possible solution would be to use a stand for the flat panel display while the flat panel display is being moved, and to use a wall mount to keep the flat panel out of the way but still viewable by the doctors or nurses when the patient is stationary. However, such a solution requires physically changing the hardware attached to the flat panel display. Physically changing the hardware on a flat panel display while the display is being used is undesirable because the doctors or nurses may not be able to make the physical changes, or may not have the time to do so, or may not have the parts handy. Additionally, it may require tools not available at the moment.

BRIEF SUMMARY OF THE INVENTION

The present invention is directed to a unitary mounting device which allows a flat panel medical display to be supported by a stand, or alternatively by a hook. In one embodiment, a "kickstand" can be adjusted to provide several viewing angles and it can be rotated upward without being disconnected from the body of the flat panel display. In another embodiment, the kickstand is attached to the back of the medical device by a standard VESA mounting bracket.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 5 and 6 show alternate embodiments of the kickstand.

DETAILED DESCRIPTION OF THE INVENTION

Figure 1:
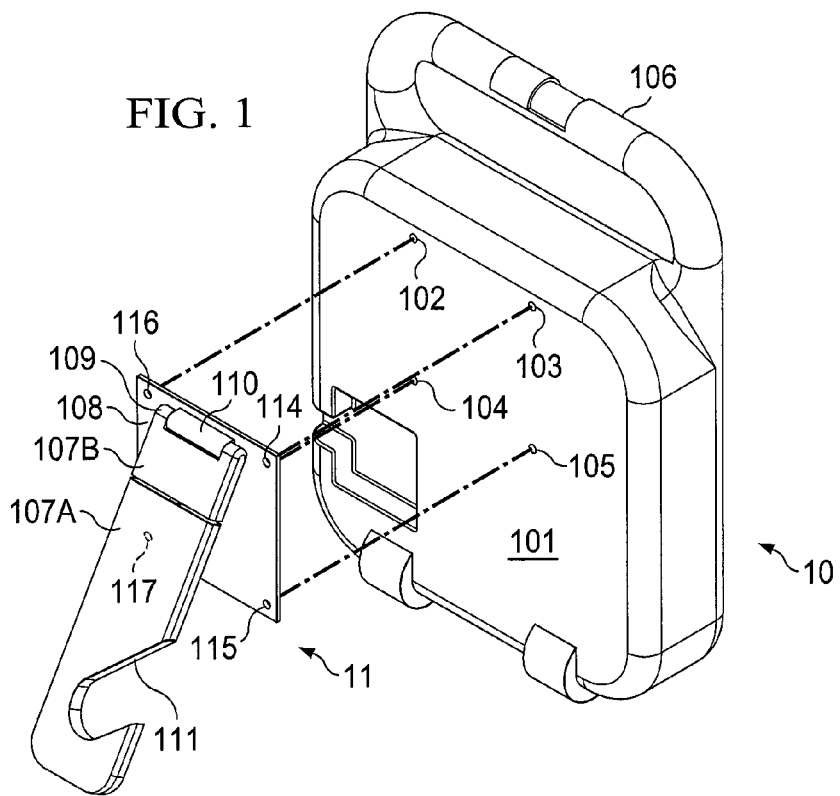
FIG. 1 shows the back of a flat panel medical display with a detached kickstand in accordance with one embodiment of the invention.

FIG. 1 shows back 101 of flat panel medical display 10 with detached kickstand 11. Note that hinge 109, 110 is positioned with reference to the back surface of display 10 so that the distal end of section 107A can rotate downward to approximately level with the bottommost structure of display 10. The distal end of the kickstand can then rotate upward to be above the uppermost structure of display 10. Back panel 101 has screw holes 102-105, positioned in conformity with the VESA MIS. In this embodiment, the centers are 75 mm apart from each other, arranged in a square pattern. Display 10 is shown with optional carrying handle 106 for carrying the display. Attached to kickstand 11 by way of hinge 109,110 is mounting plate 108. Mounting plate 108 is designed with screw holes 114-117 (or other mounting hardware) to allow the mounting plate to be attached to rear panel 101 of display 10 using mounting screws (not shown). Screw holes 102-105 are positioned such that when mounting plate 108 is attached to display 10, section 107A of kickstand 11 maybe rotated upward such that hook 111 at the distal end of 107A can rise above handle 106 (or about the top structure of display 10).

In other embodiments, kickstand 11 may be directly hinged to the back of the display without the use of a mounting plate or mounting screws. This can be accomplished, for example, by creating hinge part 110 on the back surface of the display. In other embodiments, the mounting plate and mounting screws need not conform to the VESA MIS, but may be any mounting configuration desired.

Figure 2:
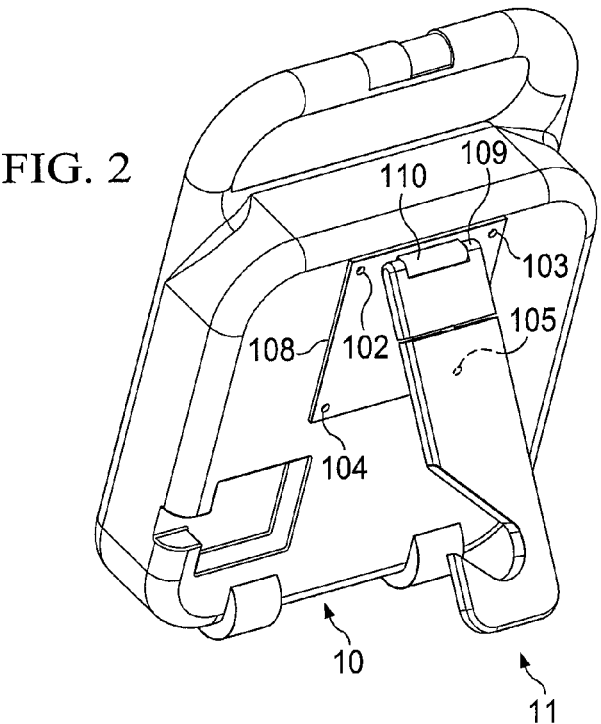
FIG. 2 shows one embodiment of the kickstand attached to the back of a flat panel medical display.

FIG. 2 shows one embodiment of kickstand 11 attached to the back of display 10 using mounting plate 108, screw holes 102-105 and mounting screws (not shown). Kickstand 11 is positioned such that it forms an angle with display 10 which allows display 10 to stand at a slope with respect to a common surface (not shown). Kickstand 11 may be positioned at different angles to allow display 10 to be viewed at a variety of angles. If desired, indents (ratchets) can be provided in hinge 109-110 to assist in maintaining a particular angle.

Figure 3:
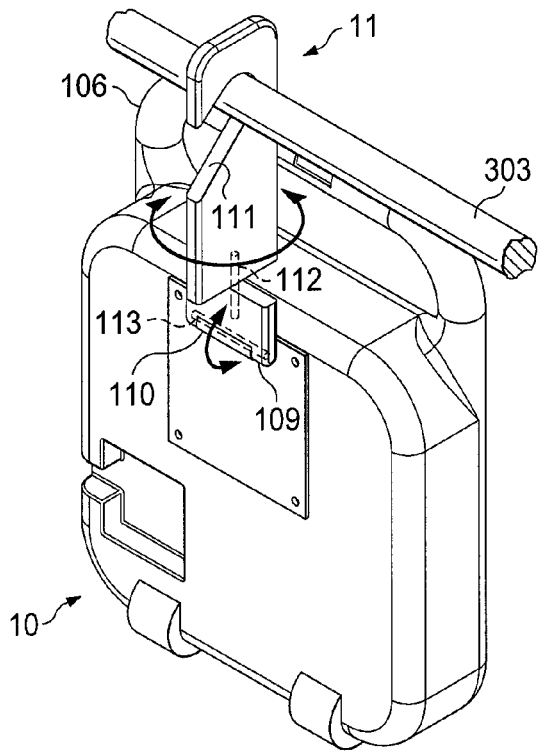
FIG. 3 shows the kickstand of FIG. 2 rotated upward to be positioned as a hook support.

FIG. 3 shows kickstand 11 rotated upward so that hook 111 can engage horizontal bar 303. Kickstand 11 rotates upward around pin 113 and can swivel from side to side around pin 112. Note that hook 111 rotates upward so that it is higher than handle 106 of display 10. Pivot point 113 functions as a swing assembly, and allows the kickstand to be swung into position to be used as a stand, or into position to be used as a hook. Rotation point 112 allows display 10 to be rotated around to be viewed at various angles.

In embodiments in which kickstand 11 does not contain rotation point 112, it may just act as a simple hook. In embodiments in which kickstand 11 does not contain pivot point 113, it may be detachable from display 10. In such an arrangement, in order to position kickstand 11 in the hook position, kickstand 11 would be detached from display 10 and repositioned in such a way that the hook assembly is above the top of display 10. Pivot points 113 and 112 may be resistant friction hinges, locking pins, free adjustment hinges with no locking mechanism, or ratchet assemblies. In some embodiments, a locking mechanism may be used to lock the device into various positions.

Figure 4:
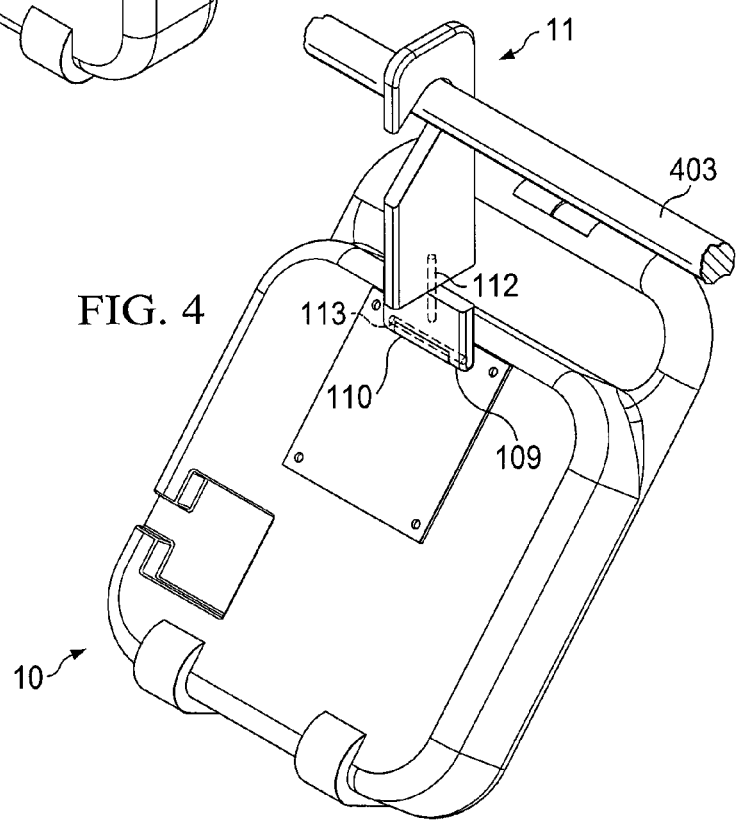
FIG. 4 shows one embodiment of the flat panel medical display device locked into a particular viewing angle.

FIG. 4 shows display 10 locked into position to provide an alternate viewing angle. Kickstand 11 is rotated upward and hung from horizontal support 403. Pin 113 has teeth which lock into various positions as kickstand 11 is rotated upwards. Hinge portions 109 and 110 are grooved such that when pin 112 is inserted, the hinge is locked in place. In other embodiments, alternate mechanisms may be used to lock display 10 into a certain angle. Such mechanisms may include a ratcheting assembly or support bar attached to the rear panel of the display. Similarly, other embodiments may use locking assemblies to lock pin 112 into a desired position.

FIG. 5 shows an alternate embodiment of a kickstand where distal end 107A (FIG. 1) has been replaced by a clamp mechanism 501A, 501B held together by spring 502. The clamp would function similar to the hook assembly in that when the kickstand is rotated down, the kickstand would function as a stand, and when the stand was rotated up, it would function as a clamp. The clamp assembly may be desirable in instances where it is important to prevent movement by display 10. Even in position as a stand, the clamp could be used to lock the display into place. FIG. 5 also shows extender mechanism 503. Extender mechanism 503 is a piece of material, such as plastic or metal, designed such that it is encased within proximal end 107B of kickstand 11, while in the contracted position. When extended, extender mechanism 503 extends outward from proximal end 107B, extending the length of kickstand 11. Extender mechanism 503 has a "T" shape, to prevent the extender from sliding completely out of proximal end 107B. Extender mechanism 503 may be desirable in instances where it is necessary to extend the length of the kickstand, for example, to allow the monitor to be closer to a doctor while the doctor is operating on a patient. Although shown with clamp mechanism 501A, 501B, extender mechanism 503 may be implemented in any embodiment of the invention. Other embodiments may use different mechanisms to extend the length of the kickstand, such as a extension rod, or telescoping piece. Additionally, other devices, such as locking pins or teeth and ridges, may be used to lock the extender mechanism into place, or prevent the extender mechanism from sliding completely out of proximal end 107B.

FIG. 6 shows another embodiment of kickstand 11 (FIG. 1) using a carabiner type hook with latch 601, which pivots around point 602, serving to lock the hook onto a horizontal support or other support. If desired, clamp mechanism 501A, 501B or distal end 601A, could be snapped into proximal end 107B of kickstand 11, if kickstand 11 were to be designed so that distal end 107A were removable from end 107B.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A visual display system having a flat screen and a rear panel arranged substantially parallel to one another, comprising:
    a kickstand formed from an elongated member, said kickstand having a hinge at one end and a hanging mechanism on an opposite end;
    means for mounting said hinge to said rear panel of said visual display device such that said hanging mechanism is free to pivot about and extend from said hinge to a surface on which said visual display device is configured to stand when said kickstand is pivoted such that said hanging mechanism is below said hinge, wherein said mounting means is further operative to allow said hanging mechanism to pivot about said hinge to a point above an uppermost structure of said device; and
    a rotational pivot point about which said hanging mechanism may rotate in relation to a longitudinal axis of said elongated member of said kickstand, said rotational pivot point located between said hanging mechanism and said hinge.

2. The system of claim 1 wherein said hanging mechanism comprises at least one of the following: a hook, a clamp, a carabiner hook.

3. The system of claim 2 further comprising a hinge lock to lock said hinge into one of multiple positions.

4. The system of claim 1 wherein said pivot point is a locking pin capable of locking into one of multiple positions.

5. A visual display system having a flat screen and a rear panel arranged substantially parallel to one another, comprising:
    a kickstand formed from an elongated member, said kickstand having a hinge at one end and a hanging mechanism on an opposite end; and
    means for mounting said hinge to said rear panel of said visual display device such that said hanging mechanism is free to pivot about and extend from said hinge to a surface on which said visual display device is configured to stand when said kickstand is pivoted such that said hanging mechanism is below said hinge, wherein said mounting means is further operative to allow said hanging mechanism to pivot about said hinge to a point above an uppermost structure of said device and wherein said mounting means comprises utilizing fasteners arranged in a VESA configuration.

6. A visual display system support comprising:
    an elongated member with a hinge on one end and a hanging mechanism on an opposite end;
    a mounting plate attached to said hinge, said mounting plate having fastener holes arranged to mate with holes on a rear surface of said visual display;
    wherein said elongated member pivots around said hinge where said hinge is attached to said visual display and wherein said elongated member has a length calculated to allow said hanging mechanism to be pivoted to a position in a plane with a bottommost structure of said display and to allow said hanging mechanism to be pivoted to another position where said hanging mechanism is above an upper most structure of said display, wherein said elongated member further comprises a rotational pivot point about which said hanging mechanism may rotate in relation to a longitudinal axis of said elongated piece, said rotational pivot point located between said hanging mechanism and said hinge.

7. The system of claim 6 wherein said hanging mechanism comprises one of the following: a hook, a clamp, a carabiner hook.

8. The system of claim 6 further comprising a hinge lock to lock said hinge into multiple positions.

9. The system of claim 8 wherein said pivot point is a locking pin capable of locking into multiple positions.

10. A method of supporting a visual display device, wherein said visual display device comprises a flat screen and a rear panel arranged parallel to one another, said method comprising:
    positioning said visual display device on a surface using a kickstand with an hanging mechanism at one end of an elongated member and a hinge on an opposite end, said kickstand pivoted about said hinge such that said hanging mechanism forms a stand extending from said hinge to said surface when it is desired to stand said display on said surface; and
    pivoting said kickstand about said hinge such that said hanging mechanism protrudes above said visual display device when it is desired to hang said visual display device via said hanging mechanism.

11. The method of claim 10 further comprising:
    rotating said hanging mechanism about a pivot point between said elongated piece and said hanging mechanism to change the horizontal viewing angle of said display.

12. The method of claim 11 further comprising:
    locking said pivot point into one position.

13. The method of claim 10 further comprising:
    locking said hinge into one position.

14. A medical device having a flat panel display on a front surface and a back surface relatively parallel to said front surface, said device comprising:
    a VESA mounted kickstand fastened to said back surface; said fastened kickstand comprising:
        a first hinge portion positioned such that a distal end of said kickstand can be adjusted from a position approximately level with a bottommost structure of said device to a position above a topmost structure of said device; and
        a hook fashioned at said distal end of said kickstand, wherein said kickstand further comprises:
    a first portion containing said distal end, said second portion hingeably connected to said first portion, said first hinge portion and said second hinge portion allowing for rotational movement to different directions.

15. The device of claim 14 wherein said rotational movement directions are approximately 90 degrees with respect to each other.

16. A method of positioning a medical device, said method comprising:

rotating a kickstand such that its distal end is parallel with a bottommost surface of said device when desiring said device to sit on a structure, said kickstand being rotated about a hinge point fixed at a certain location on a back surface of said device, said rotating adjusting a viewing angle of a front surface of said device; and rotating said kickstand about said hinge point such that a hook constructed at said distal end of said kickstand is positioned above an uppermost surface of said device when desiring said device to hang from a structure.

17. The method of claim 16 further comprising:

rotating a first portion of said kickstand around a second portion of said kickstand to adjust a viewing angle of said front surface of said device when said device is being hung from a structure.

* * * * *